United States Patent
Liu et al.

(10) Patent No.: US 8,294,788 B2
(45) Date of Patent: Oct. 23, 2012

(54) HAND-HELD DEVICE HAVING POSITIONING AND PHOTOGRAPHING FUNCTIONS AND GEOGRAPHICAL POSITIONING METHODS THEREOF

(75) Inventors: I-Ru Liu, Taipei (TW); Ting-I Tsai, Taipei (TW); Te-Yao Liu, Taipei (TW)

(73) Assignee: Accton Wireless Broadband Corporation, Hsinchu (TW)

( * ) Notice: Subject to any disclaimer, the term of this patent is extended or adjusted under 35 U.S.C. 154(b) by 196 days.

(21) Appl. No.: 12/651,835

(22) Filed: Jan. 4, 2010

(65) Prior Publication Data

US 2010/0289905 A1 Nov. 18, 2010

(30) Foreign Application Priority Data

May 15, 2009 (TW) .............................. 98116243 A

(51) Int. Cl.
*H04N 5/76* (2006.01)
*H04N 5/228* (2006.01)
(52) U.S. Cl. .................................. 348/231.3; 348/208.2
(58) Field of Classification Search ............... 348/208.2, 348/211.2, 231.99, 231.3–231.6
See application file for complete search history.

(56) References Cited

U.S. PATENT DOCUMENTS

| | | | |
|---|---|---|---|
| 6,253,129 B1 * | 6/2001 | Jenkins et al. | 701/29 |
| 2003/0020816 A1 * | 1/2003 | Hunter et al. | 348/231.3 |
| 2007/0109414 A1 * | 5/2007 | Liao et al. | 348/208.4 |
| 2009/0138199 A1 * | 5/2009 | Bonanni et al. | 701/214 |

* cited by examiner

*Primary Examiner* — Kelly L Jerabek
(74) *Attorney, Agent, or Firm* — Muncy, Geissler, Olds & Lowe, PLLC

(57) ABSTRACT

A hand-held device having positioning and photographing functions and geographical positioning methods thereof is provided. The hand-held device includes a photographing module, a positioning module, a database and a processor. The photographing module photographs environment of a shooting place to form a digital picture. The positioning module accesses a positioning data of the shooting place. The processor matches the positioning data of the shooting place with a geographical positioning condition when the digital picture is obtained, so as to get a target geographical area data corresponding to the shooting place, from all geographical area data. The target geographical area data is displayed on the digital picture corresponding to the shooting place and the geographical positioning condition is an area center data of every geographical area data or plural boundary pointers which include boundary coordinates of every geographical area data.

14 Claims, 13 Drawing Sheets

HAND-HELD DEVICE HAVING POSITIONING AND PHOTOGRAPHING FUNCTIONS AND GEOGRAPHICAL POSITIONING METHODS THEREOF

CROSS-REFERENCE TO RELATED APPLICATION

This application claims the benefit of Taiwan Patent Application No. 098116243, filed on May 15, 2009, which is hereby incorporated by reference for all purposes as if fully set forth herein.

BACKGROUND OF THE INVENTION

1. Field of the Invention

The present invention relates to a hand-held device and geographical positioning methods thereof, and more particularly to a hand-held device and its geographical positioning methods that reduce positioning data used for computing through the positioning methods and display geographical area data on a digital picture.

2. Description of the Prior Art

In a conventional technique, when a user uses a hand-held device having photographing and positioning functions, such as a digital camera, a cell phone or a navigator, he or she will activate a positioning module of the hand-held device to perform photographing. This hand-held device will access positioning data for a current geographical location through a global positioning system (GPS) and record data in an exchangeable image file format (EXIF) of a digital picture or directly display on the digital picture.

After accessing the positioning data, the navigator will perform geographical positioning to obtain a current location of the navigator itself. Yet the navigator obtains accurate geographical area data by scanning geographical area databases one by one and comparing positioning data with coordinates of each area.

From the aforementioned descriptions, the positioning data accessed by the navigator is normally numerical values of latitude-longitude coordinates. The user needs to input the latitude-longitude coordinates into the hand-held device or other electronic map system, which uses the latitude-longitude coordinates to search for a target location, so that a shooting place where the digital picture is taken can be known. Although the exchangeable image file of the digital picture can be used to store more diversified data, a program or machine capable of reading the exchangeable image file must be used to acquire the related data such as the shooting place where the digital picture is taken. Besides, since the hand-held device scans databases one by one and compares the positioning data with the coordinates of each area, the required hardware capability is also higher due to greater computation load of data.

As a result, how to quickly access data of the shooting place where the digital picture is taken to provide the user with a reference and how to quickly access the positioning data and the correspondingly geographical area data without increasing hardware design and manufacturing cost are an important issue.

SUMMARY OF THE INVENTION

The primary object of the present invention is to provide a hand-held device and a positioning method for rapidly obtaining geographical area data according to positioning data and directly displaying geographical area data on a digital picture.

The technique provided by the present invention discloses a hand-held device provided with positioning and photographing functions. This hand-held device includes a photographing module, a positioning module, a database and a processor. The photographing module is used to photograph environment of a shooting place to form a digital picture. The positioning module is used to access positioning data of the shooting place. The database is used to store plural geographical area data and at least one geographical positioning condition. The processor couples the photographing module and the positioning module. After accessing the digital picture, the processor matches the positioning data of the shooting place with the geographical positioning condition to obtain a target geographical area data corresponding to the shooting place from all geographical area data. The processor will also display the target geographical area data on the digital picture corresponding to the shooting place.

The technology provided by the present invention discloses a geographical positioning method. The method includes the following steps of obtaining positioning data to compare with area center data of every first geographical area data within plural first geographical area data, obtaining target geographical area data based on a comparison result, wherein an Euclidean distance between the area center data of the target geographical area data and the positioning data is the smallest, determining whether or not the target geographical area data includes plural second geographical area data to decide whether or not these second geographical area data are taken as the plural first geographical area data, and comparing the positioning data with the area center data of every first geographical area data again or storing the target geographical area data.

The technology provided by the present invention discloses another geographical positioning method. The method includes the following steps of obtaining positioning data and plural boundary pointers of plural first geographical area data, looking up plural target boundary pointers close to the positioning data from all boundary pointers, accessing a target geographical area data from all first geographical area data according to the target boundary pointers, determining whether or not the target geographical area data includes plural second geographical area data to decide whether or not these second geographical area data are taken as plural first geographical area data, and comparing the positioning data again with the area center data of every first geographical area data again or storing the target geographical area data.

Accordingly, the hand-held device having the positioning and photographing functions disclosed by the present invention uses the positioning data corresponding to the shooting place to find out the geographical area data corresponding to the shooting place to display the geographical area data on the digital picture, thereby intuitively inspecting the digital picture. The digital pictures and details at the shooting places can be conveniently collected and recalled by the user.

In the geographical positioning methods disclosed by the present invention, an area center data is used as a comparison data for every geographical area data or plural boundary pointers are used to separate every geographical area data. The positioning data is only used to compare with the area center data or find out the target boundary pointers close to the positioning data so as to obtain the target geographical area data. The comparison data stored in navigation devices applying these methods is the aforementioned area center data or the boundary pointers to facilitate reducing data storage capacity. As the data needed for comparison is decreased, a computation speed of geographical positioning can be improved, and at a same time, it is beneficial to navigation devices with inferior hardware capability as well.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
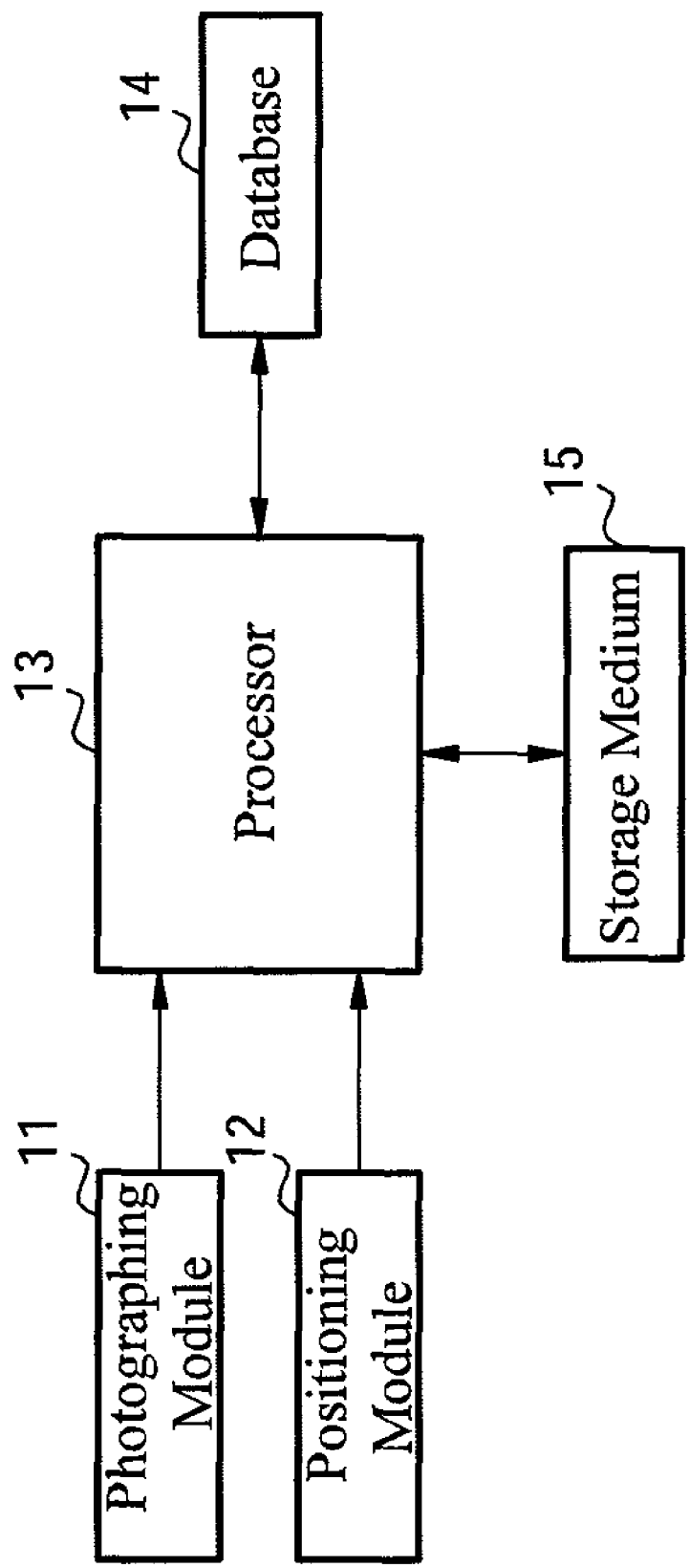
FIG. 1 shows a device block diagram of an embodiment of the present invention.

Referring to FIG. 1, it shows a device block diagram of an embodiment of the present invention. This hand-held device comprises a photographing module 11, a positioning module 12, a database 14 and a processor 13 which couples the photographing module 11, the positioning module 12 and the database 14.

The photographing module 11 provides a user to photograph at a shooting place and projects, records and renders an environment of the shooting place to form a digital picture. Before or while shooting, the positioning module 12 is activated to access positioning data corresponding to the shooting place from a global positioning system (GPS) or an auxiliary global positioning system (AGPS). In general, the positioning data refers to coordinates of latitude and longitude at the shooting place.

The processor 13 receives the digital picture captured by the photographing module 11 and the positioning data of the shooting place provided by the positioning module 12. The processor 13 will match the positioning data of the shooting place with a geographical positioning condition stored in the database 14 in accordance with a geographical positioning method to obtain target geographical area data corresponding to the shooting place from all geographical area data. In addition, the processor 13 will combine the target geographical area data with the digital picture so that the target geographical area data can be directly displayed on the digital picture. Finally, the digital picture is compressed as an image file, and the image file is stored in a storage medium 15 of the hand-held device itself, whereas the storage medium 15 refers to a memory card or a memory. The target geographical area data is an address selected from a group consisting of a country, a state, a province, a metropolitan, a territory, a shire, a county, a city, a township, a village, a road, a boulevard, a street, a section, a lane, an alley and a number, and the target geographical area data can be referred to a geographical name.

On the other hand, the geographical positioning condition used by the processor 13 includes following two types.

For a first type, the geographical positioning condition includes an area center data of every geographical area data. It is described here that since the shape of the geographical area represented by every geographical area data may not be a regular polygon, the area center data refers to a logical center location of the geographical area data such as latitude and longitude coordinates. In addition, the area center data can be pointed to a major city of the geographical area data (e.g., Nantou city of Nantou county, Changhua city of Changhua county in Taiwan), a landscape (e.g., Taipei 101, Confucian shrine, Martyr's shrine in Taiwan) or even a special place (city hall, train station, department store).

The processor 13 compares the positioning data of the shooting place with the area center data to find out the target geographical area data and a Euclidean distance between the area center data of the target geographical area data and the positioning data of the shooting place is the smallest.

For a second type, the geographical positioning condition includes plural boundary pointers which contain boundary coordinates of every geographical area data. These boundary pointers function as national borders for dividing countries, provincial borders for dividing states or provinces, and city borders for dividing cities. The boundary pointers existing in the geographical area data can be marked in advance, and are primarily used to divides boundaries of every geographical area data. Therefore, locations marked by the boundary pointers do not need to show real boundary stones in physical geographical locations.

The processor 13 finds out plural target boundary pointers adjoined to the positioning data of the shooting place from the boundary pointers and then matches all target boundary pointers with the boundary pointers so as to find out target geographical area data belonging to all target boundary pointers.

Figure 2A:
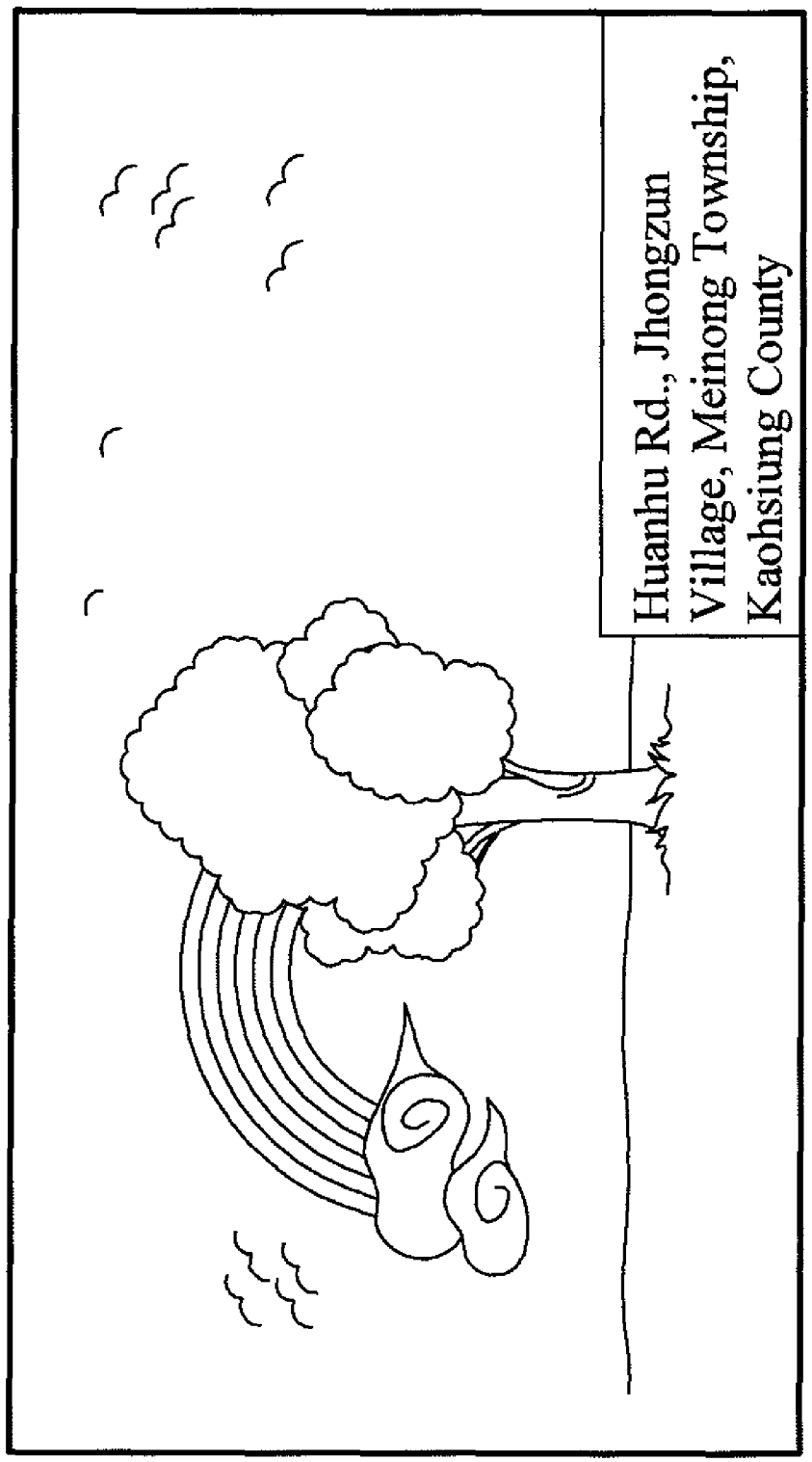
FIG. 2A shows a schematic view of a first marked target geographical area data of an embodiment of the present invention.
Figure 2B:
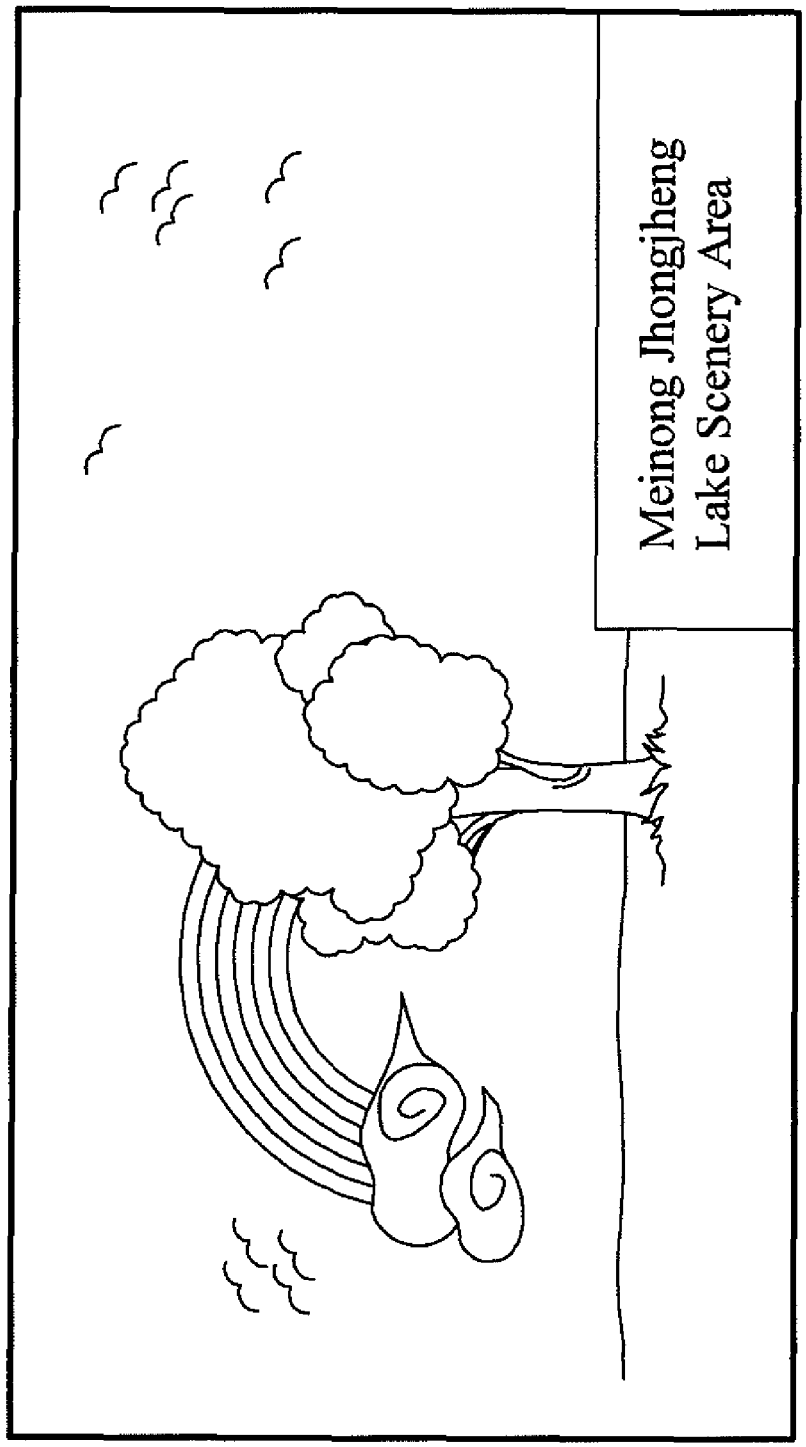
FIG. 2B shows a schematic view of a second marked target geographical area data of an embodiment of the present invention.

Referring to FIG. 2A and FIG. 2B at the same time, FIG. 2A shows a schematic view of a first marked target geographical area data of an embodiment of the present invention, whereas FIG. 2B shows a schematic view of a second marked target geographical area data of an embodiment of the present invention. As described above, the target geographical area data accessed by the processor can have two different types, wherein the first type is the address and the other type is the geographical name.

Herein it is assumed that the user shoots at Meinong Jhongjheng Lake Scenic Area, Kaohsiung County, Taiwan. If the target geographical area data accessed by the processor belongs to the address-type, then the processor will directly put the address of Meinong Jhongjheng Lake Scenic Area, which is Huanhu Rd., Jhongzun Village, Meinong Township, Kaohsiung County, on a digital picture (as shown in FIG. 2A). In another word, when the target geographical area data accessed by the processor belongs to the type of geographical name, the processor will put the words of Meinong Jhongjheng Lake Scenic Area directly on the digital picture (as shown in FIG. 2B).

Figure 3A:
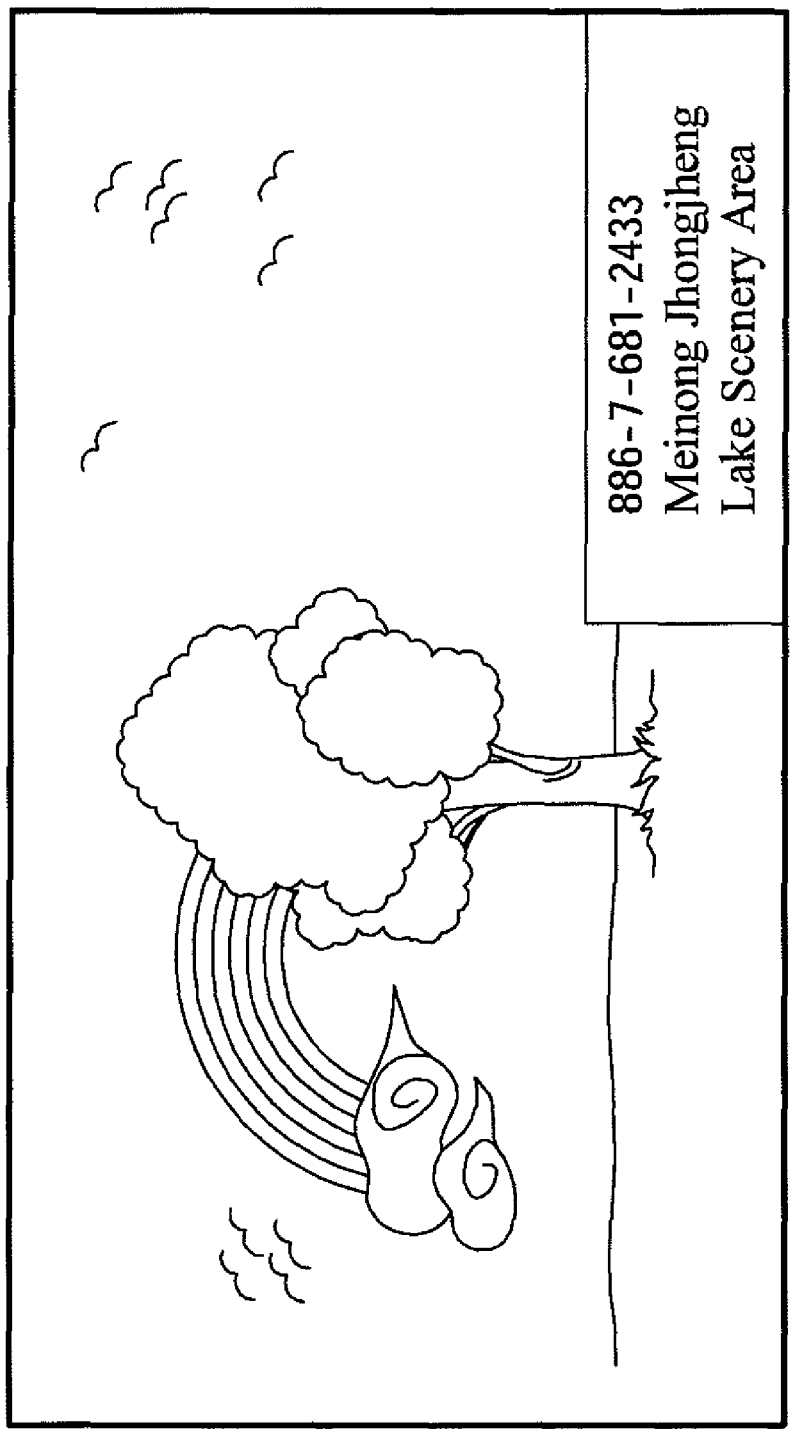
FIG. 3A shows a schematic view of an international phone number corresponding to a marked target geographical area data of an embodiment of the present invention.
Figure 3B:
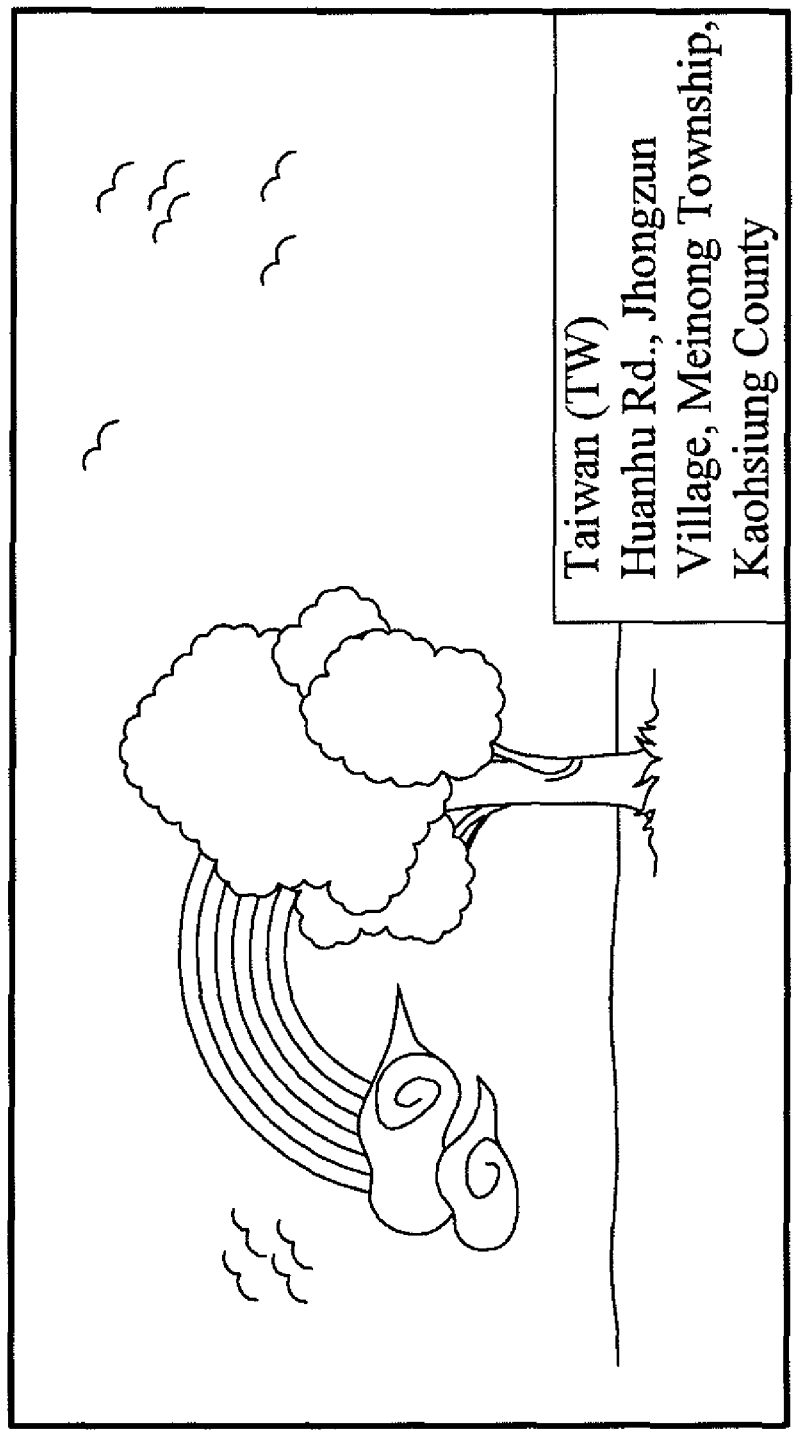
FIG. 3B shows a schematic view of a country code corresponding to a marked target geographical area data of an embodiment of the present invention.

Referring to FIG. 3A and FIG. 3B simultaneously, FIG. 3A shows a schematic view of an international phone number corresponding to a marked target geographical area data of an embodiment of the present invention and FIG. 3B shows a schematic view of a country code corresponding to a marked target geographical area data of an embodiment of the present invention.

The database 14 is further stored with an international telephone coding corresponding to every geographical area data, wherein the international telephone coding includes a country code, an area code and a called number.

As shown in FIG. 3A, the processor 13 displays a target international telephone number corresponding to the target geographical area data (the shooting place) beside the address name of Meinong Jhongjheng Lake Scenic Area. The target international telephone number is 886-7-681-2433, wherein 886 is the country code of Taiwan, and 7 is the area code of Kaohsiung, and 6812433 is the called number of Jhongjheng Lake Tour Service Center, allowing the user or other person to use a navigator with a telephone navigation function to conduct telephone navigation while obtaining this picture.

On the other hand, the database 14 is further stored with a country code corresponding to every geographical area data, such as Taiwan is TW, Japan is JP, United States of America is US, Korean is KR, etc.

Figure 4:
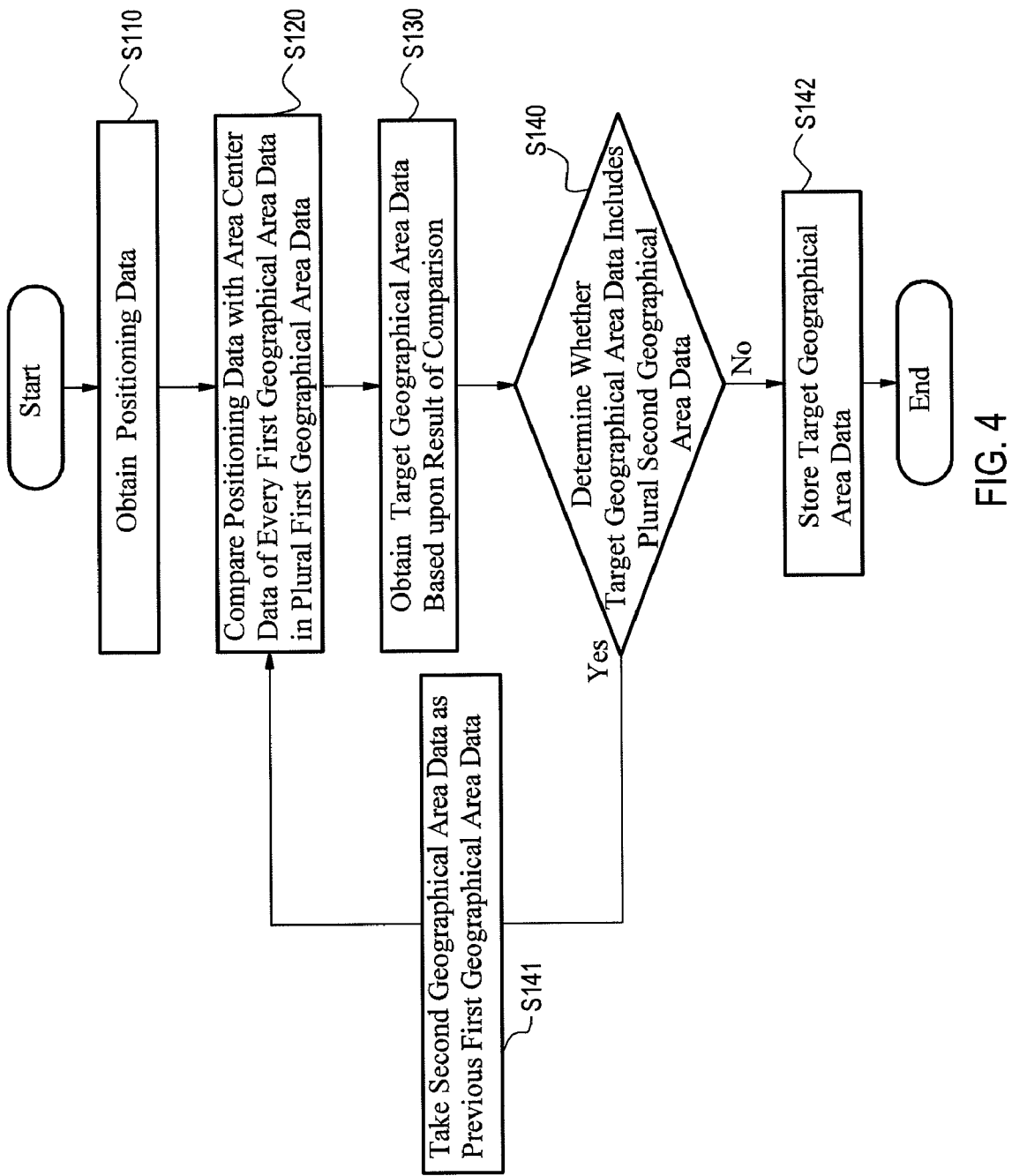
FIG. 4 shows a flow diagram of a first geographical positioning method of an embodiment of the present invention.
Figure 5A:
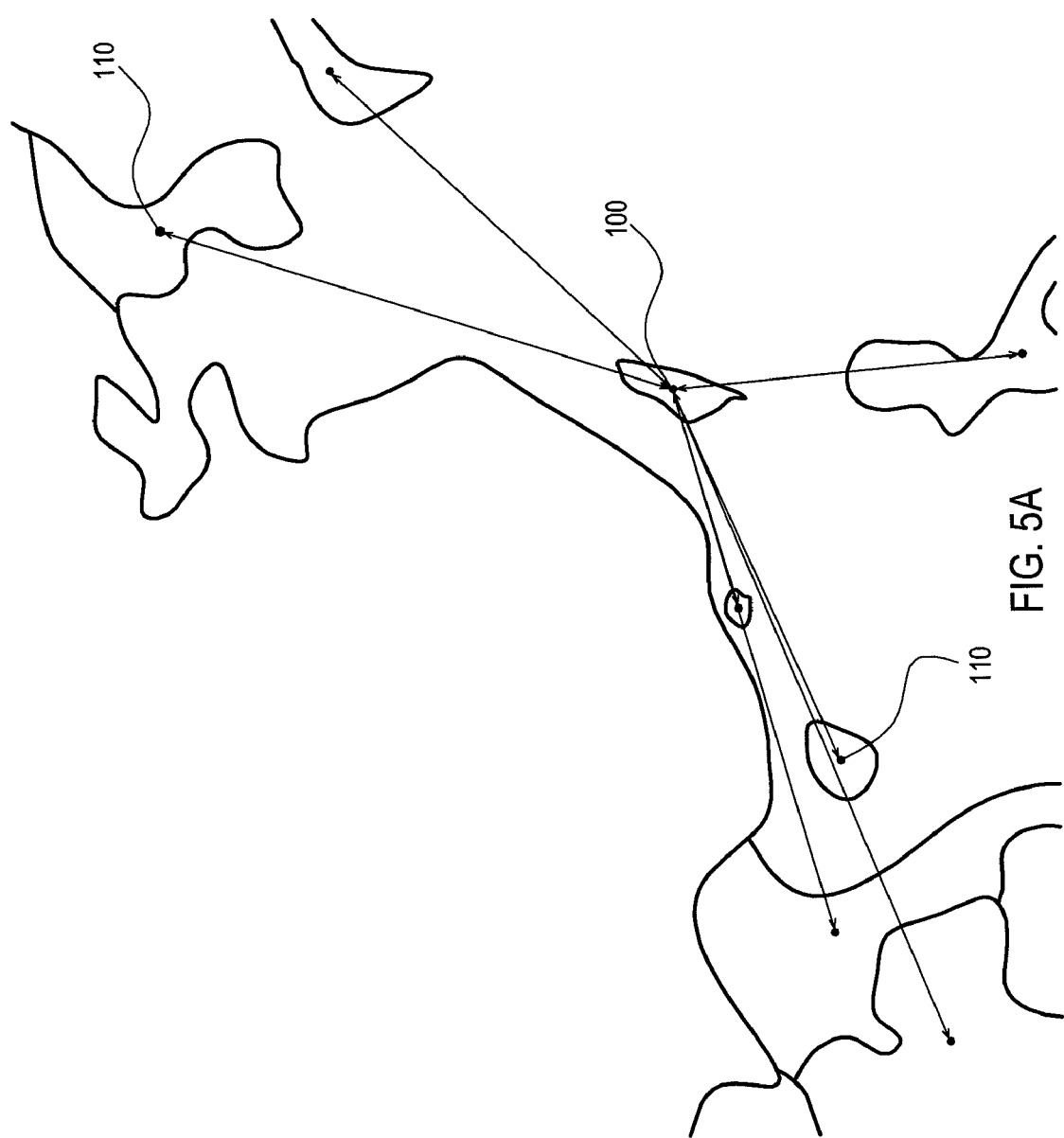
FIG. 5A shows a marked graph of an area center data in a country area data of an embodiment of the present invention.
Figure 5B:
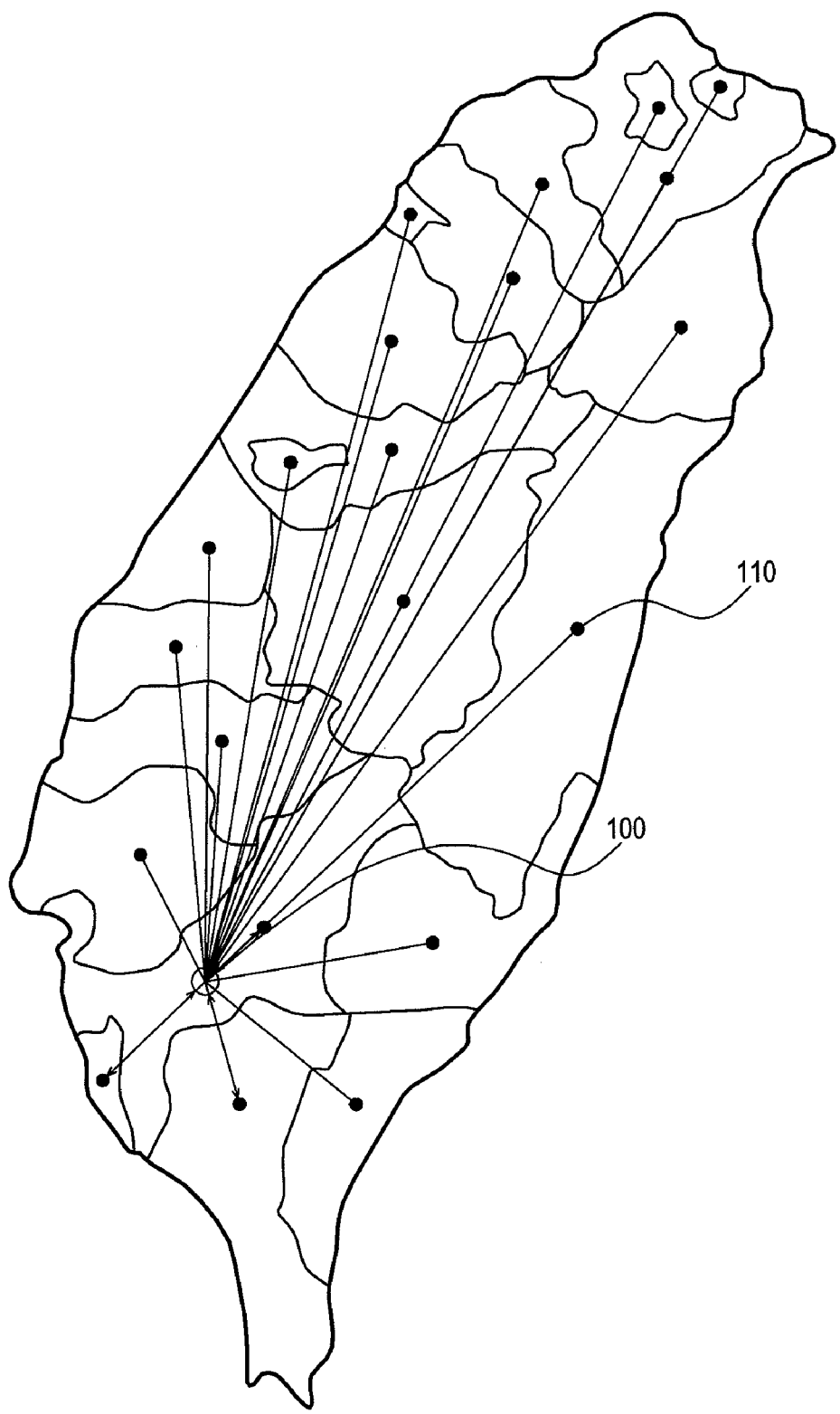
FIG. 5B shows a marked graph of an area center data in a state or province area data of an embodiment of the present invention.
Figure 5C:
FIG. 5C shows a marked graph of an area center data in a county or city area data of an embodiment of the present invention.

As shown in FIG. 3B, the processor 13 displays a target country code corresponding to the target geographical area data (the shooting place) beside the location name of Huanhu Rd., Jhongzun Village, Meinong Township, Kaohsiung County. The target country code is Taiwan (TW), but can also be displayed as Taiwan or her country code, TW, not limited to Taiwan (TW). Referring to FIG. 4, it shows a flow diagram of a first geographical positioning method of an embodiment of the present invention and referring to FIG. 1 at the same time to help the understanding; this method is applied to the hand-held device as shown in FIG. 1. Referring to FIGS. 5A to 5C, FIG. 5A shows a marked graph of an area center data in country area data of an embodiment of the present invention, and FIG. 5B shows a marked graph of an area center data in state or province area data of an embodiment of the present invention, and FIG. 5C shows a marked graph of an area center data in county or city area data of an embodiment of the present invention.

Positioning data is obtained (Step S110). When the positioning module 12 is activated, current positioning data of the hand-held device is accessed and transmitted to the processor 13.

The positioning data is compared with area center data of every first geographical area data in plural first geographical area data (Step S120). In the present embodiment, the database 14 stores plural geographical area data which are divided into plural levels. Geographical area of each level data represents a different range.

Geographical area data of a first level refers to a most general area such as country area data. Geographical area data of a second level is the geographical area data within the first level such as state or province area data included in every country area data. Geographical area data of a third level is the geographical area data within the second level such as county or city area data included in every state of province area data, and so on until geographical area data of the last level is compared. Geographical area data of these levels is not limited to the first level as the country area data, but the county, city or township data can be taken as geographical area data of the first level to conduct geographical positioning as well. Yet, some countries do not include states or provinces but directly contain counties or cities data.

In this step S120, as shown in FIG. 5A, the processor 13 compares the positioning data 100 with plural first geographical area data, i.e., the area center data 110 of every country area data. As described above, the area center data 110 refers to the logical center location of the geographical area data such as latitude and longitude coordinate, a major city of the geographical area data, a landscape or a special place. The processor 13 will compute the Euclidean distance between the positioning data 100 and the area center data 110 of every country area data.

Target geographical area data is obtained with respect to a comparison result (Step S130). The processor 13 finds out the area center data 110 that is the closest to the positioning data 100 based upon each Euclidean distance and the first geographical area data of this area center data 110 is taken as the target geographical area data.

The processor 13 determines whether or not the target geographical area data includes plural second geographical area data (Step S140). In this step, the second geographical area data is taken as geographical area data of a next level included in the first geographical area data. Since the current target geographical area data belongs to the country area data, it definitely covers more than one province area data, state area data, metropolitan area data, territory area data, shire area data, county area data or city area data, i.e., the aforementioned second geographical area data.

The processor 13 takes the second geographical area data as the previous first geographical area data (Step S141) and re-executes step S120 and step S130. At this time, the first geographical area data will be converted from the country area data into the province area data, state area data, metropolitan area data, territory area data or shire area data that it includes. After executing step S130, the target geographical area data of the type of province area data, state area data, metropolitan area data, territory area data or shire area data is obtained. Next, step S140 is executed again. If the processor 13 has determined that the target geographical area data still contains plural second geographical area data such as the county area data or city area data, then step S141 is executed again. The processor 13 continuously executes step S141, step S120, step S130 and step S140 in a cycle until the target geographical area data is the geographical area data of the last level in the database.

When the processor 13 has determined that the target geographical area data does not contain plural second geographical area data as the target geographical area data that is determined as the geographical area data of the last level, then the target geographical area data is stored (step S142).

Taking the aforementioned Meinong Jhongjheng Lake Scenic Area as an example, when the processor 13 accesses the positioning data 100 of Meinong Jhongjheng Lake Scenic Area as its latitude-longitude coordinates, the processor 13 will firstly compare the positioning data 100 with the area center data 110 of the country area data to find out the country area data of Republic of China (or Taiwan) (as shown in FIG. 5A). Next, the processor 13 compares the positioning data 100 with the area center data 110 of every county area data and city area data of Republic of China to find out the county area data of Kaohsiung county (as shown in FIG. 5B). Finally, the processor 13 compares the positioning data 100 with the area center data 110 of every township area data of Kaoshiung county to find out the township area data of Meinong township (as shown in FIG. 5C), and so on until the address of Huanhu Rd., Jhongzun Village, Meinong Township, Kaohsiung County or the geographical name of Meinong Jhongjheng Lake Scenic Area is found out.

Figure 6:
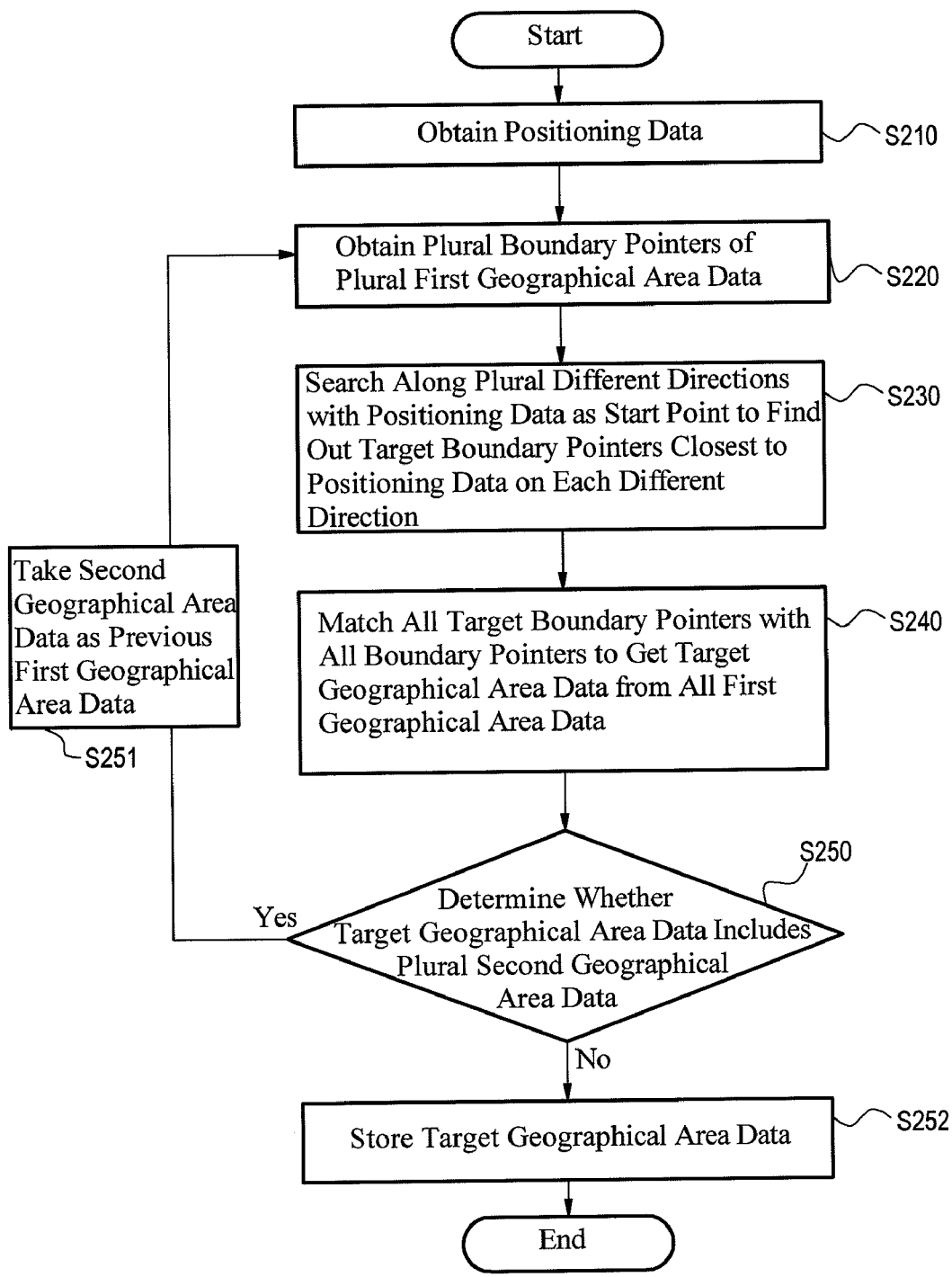
FIG. 6 shows a flow diagram of a second geographical positioning method of an embodiment of the present invention.
Figure 7A:
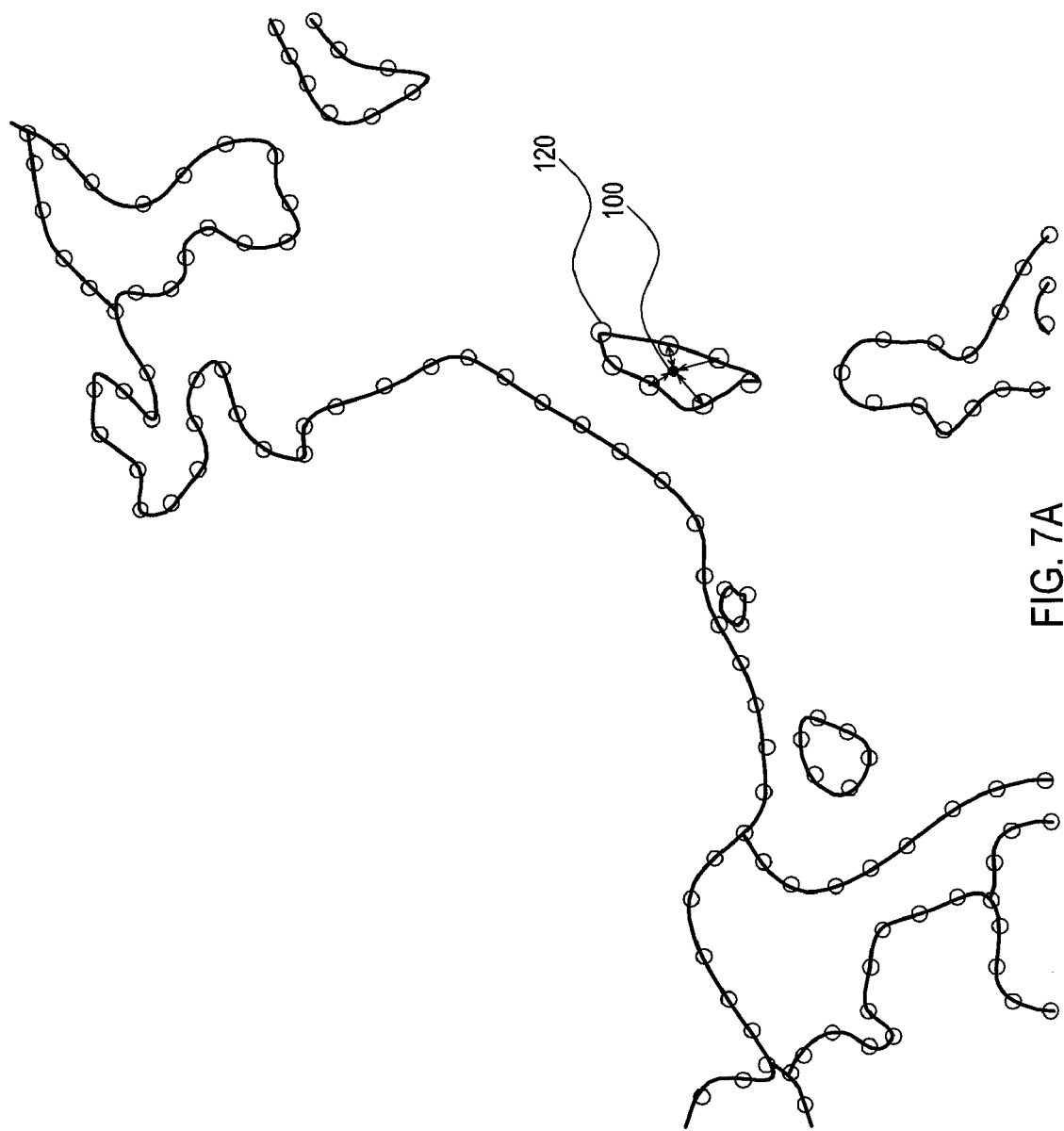
FIG. 7A shows a marked graph of boundary pointers for a country area data of an embodiment of the present invention.
Figure 7B:
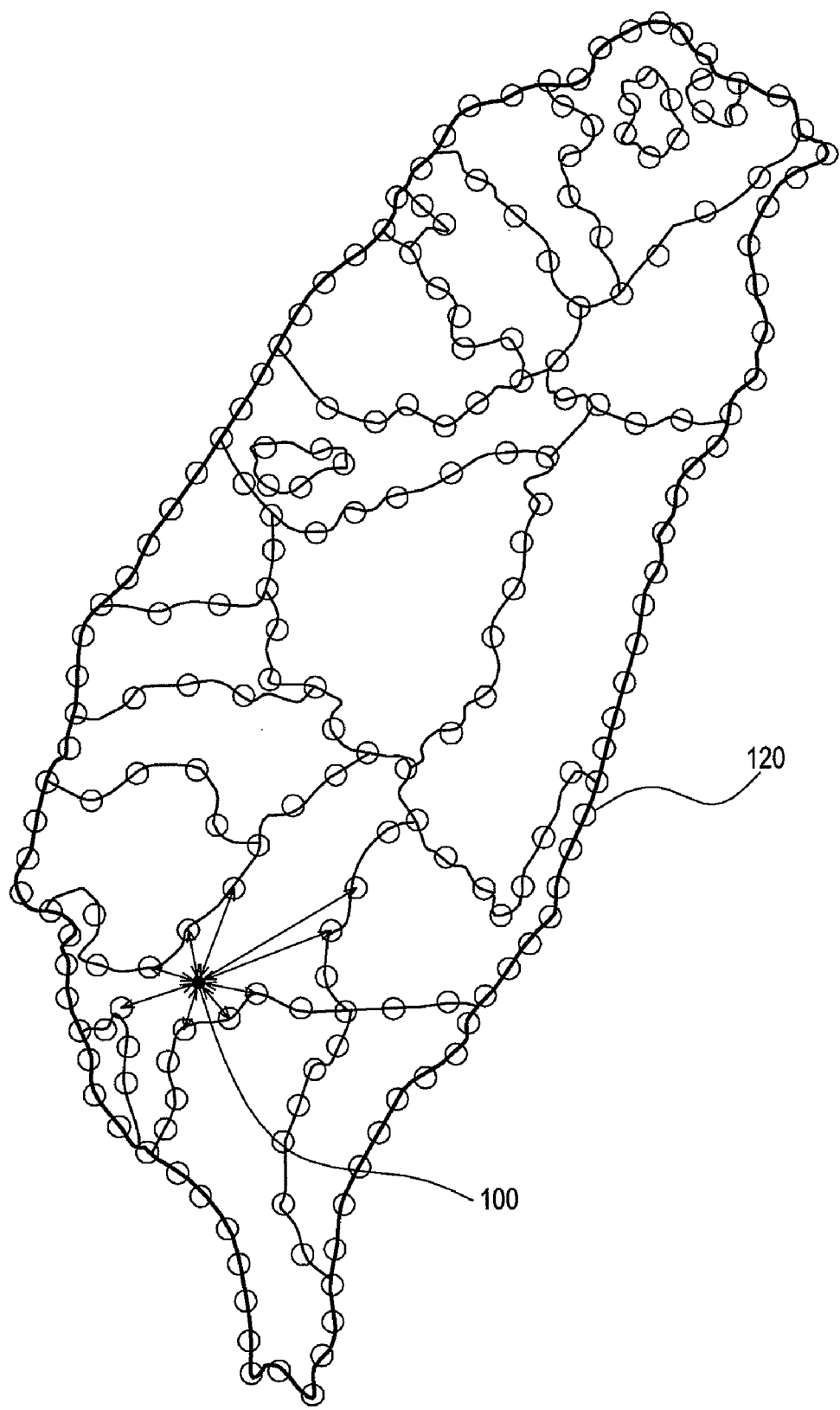
FIG. 7B shows a marked graph of boundary pointers for a state or province area data of an embodiment of the present invention.
Figure 7C:
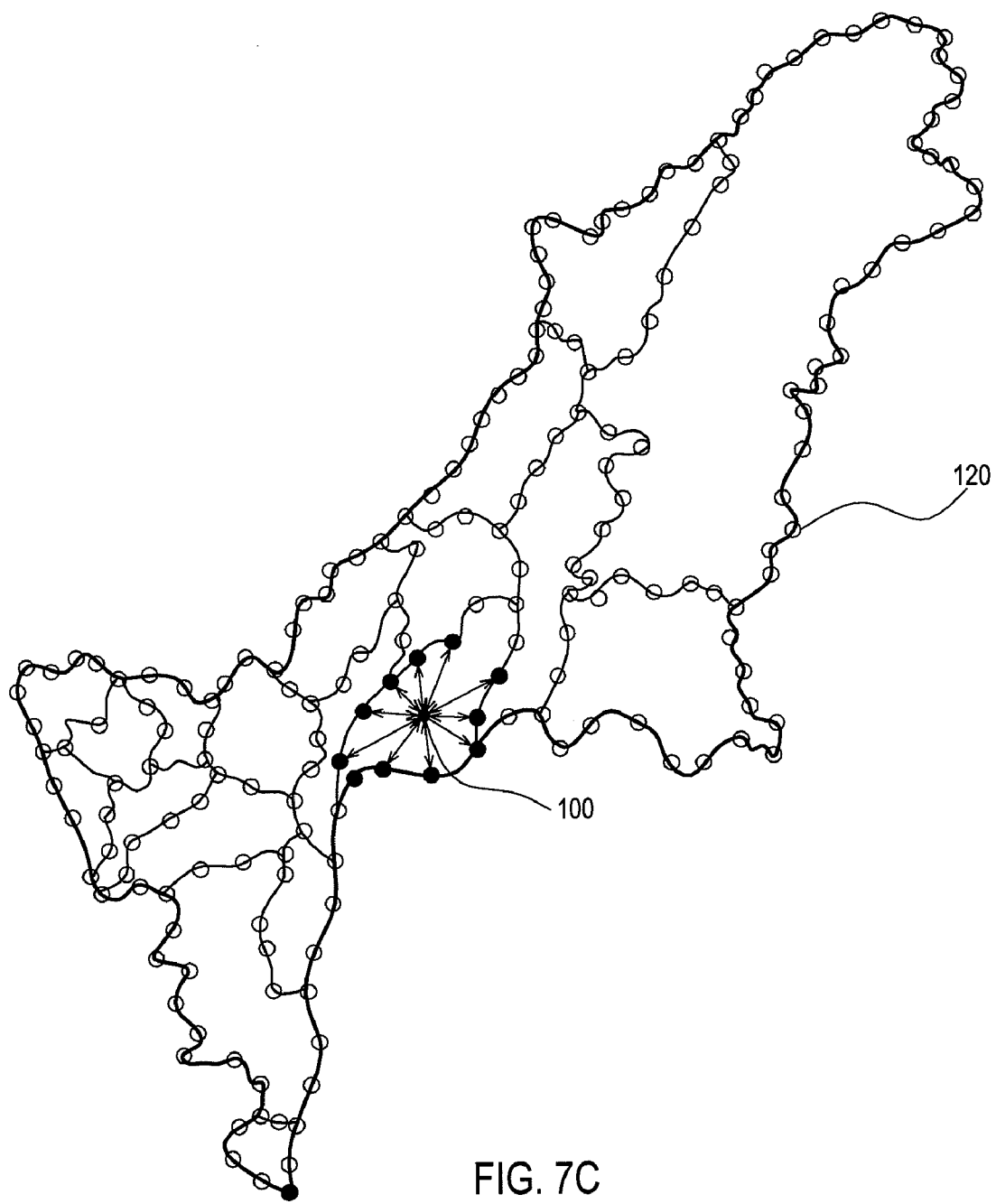
FIG. 7C shows a marked graph of boundary points for a county or city area data of an embodiment of the present invention.

Referring to FIG. 6, it shows a flow diagram of a second geographical positioning method of an embodiment of the present invention and simultaneously referring to FIG. 1 to help the understanding; this method is applied to the hand-held device as shown in FIG. 1. In addition, referring to FIGS. 7A to 7C, FIG. 7A shows a marked graph of boundary pointers for a country area data of an embodiment of the present invention, and FIG. 7B shows a marked graph of boundary pointers for a county or city area data of an embodiment of the present invention, and FIG. 7C shows a marked graph of boundary points for township area data of an embodiment of the present invention.

Positioning data is obtained (Step S210). When the positioning module 12 is activated, current positioning data of the hand-held device is accessed and transmitted to the processor 13.

Plural boundary pointers of plural first geographical area data are obtained (Step S220). In the database 14, geographical area data of each level stores plural boundary pointers 120 which are used to mark boundary coordinates 120 of every geographical area data. Besides, each geographical area data records boundary coordinates 120 which are contacted. As described above, the boundary pointers 120 function as national borders which separate countries, provincial borders which separate states, provinces, metropolitans, territories or shires, county or city borders which separate counties or cities, township borders which separate towns, village or neighborhood borders which separate villages or neighborhoods and road borders which separate boulevards or roads. In the present embodiment, the country area data is similarly used as the geographical area data of the first level, and at this time, the first geographical area data refers to the country area data (as shown in FIG. 7A).

The processor 13 takes the positioning data as a start point to perform the search along different directions to find out the target boundary pointers that is the closest to the positioning data on each different direction (Step S230). Here, the different directions mean that the target of each direction is different. For example, the different direction can be refer to direction of Up, Down, Right and Left It is described here that the first geographical area data at this time belongs to the type of country area data, hence, the boundary pointers 120 represent the boundaries of every country area data and include the boundary coordinates of every country area data (as shown in FIG. 7A).

The processor 13 matches the target boundary pointers with all boundary pointers to find out the target geographical area data from all first geographical area data (Step S240). It is described here that when the positioning data 100 is at any country area data, the target boundary pointers which are found are the boundary pointers 120 that is in contact with this country area data. In addition, every boundary pointer 120 records the connected geographical area data. As a result, in the present embodiment, when the processor 13 matches the target boundary pointers with the boundary pointers, country area data is found out from all matched boundary pointers. This country area data includes all matched target boundary pointers and is the target geographical area data.

The processor 13 determines whether or not the target geographical area data includes plural second geographical area data (Step S250). In this step, the second geographical area data is taken as the geographical area data of a next level included in the first geographical area data. Since the current target geographical area data belongs to the type of country area data, it definitely covers more than one province area data, state area data, metropolitan area data, territory area data or shire area data, i.e., the aforementioned second geographical area data.

The processor 13 takes the second geographical area data as the previous first geographical area data (Step S251) and re-executes step S220, step S230 and step S240. At this time, the first geographical area data will be converted from the country area data into the province area data, state area data, metropolitan area data, territory area data or shire area data included under the country area data. After executing step S240, the target geographical area data of the type of province area data, state area data, metropolitan area data, territory area data or shire area data is obtained. Next, step S250 is executed again. If the processor 13 has determined that the target geographical area data still includes plural second geographical area data, such as county or city area data, then step S141 is executed again. The processor 13 continuously executes step S251, step S220, step S230, step S240 and step S250 in a cycle until the target geographical area data is the geographical area data of the last level in the database.

When the processor 13 has determined that the target geographical area data does not include plural second geographical area data as the target geographical area data that is determined as the geographical area data of the last level, then the target geographical area data is stored (step S252).

Taking the aforementioned Meinong Jhongjheng Lake Scenery Area as an example, when the processor 13 accesses the positioning data 100 of Meinong Jhongjheng Lake Scenery Area as the latitude-longitude coordinates, the processor 13 will firstly compare the positioning data 100 with the boundary pointers 120 of the country area data (as shown in FIG. 7A) to find out the country area data of Republic of China (or Taiwan). Afterward, the processor 13 compares the positioning data 100 with the boundary pointers 120 of the county or city area data of Republic of China (as shown in FIG. 7B) to find out the county area data of Kaoshiung county, and further compares the positioning data 100 with the boundary pointers of the township area data of Kaoshiung county (as shown in FIG. 7C) to find out the township area data of Meinong township, and so on until the address of Huanhu Rd., Jhongzun Village, Meinong Township, Kaohsiung County or the geographical name of Meinong Jhongjheng Lake Scenic Area is found out.

In addition, disregarding using what kind of method for positioning, the geographical area data includes at least, but not limited to, few levels of data arrangement as the following. In fact, all similar levels of data arrangement can be applied to the positioning method described in the present invention. The levels of data arrangement include (1) the first geographical area data that is taken as the country area data; the second geographical area data that is taken as the province area data, state area data, metropolitan area data, territory area data or shire area data (2) the first geographical area data that is taken as the province area data, state area data, metropolitan area data, territory area data or shire area data; the second geographical area data that is taken as the county area data or city area data (3) the first geographical area data that is taken as the county area data or city area data; the second geographical area data that is taken as the township area data (4) the first geographical area data that is taken as the county area data, city area data or township area data; the second geographical area data that is taken as the village area data, neighborhood area data, boulevard area data or road area data (5) the first geographical area data that is taken as the county area data, city area data or township area data; the second geographical area data that is taken as the landscape data (6) the first geographical area data that is taken as the country area data; the second geographical area data that is taken as the county area data or city area data.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A hand-held device having positioning and photographing functions, the hand-held device comprising:
    a photographing module which is used to photograph an environment of a shooting place to form a digital picture;
    a positioning module which is used to access positioning data of the shooting place;
    a database which stores plural geographical area data; and
    a processor which couples the photographing module, the positioning module and the database; wherein while obtaining the digital picture, the processor compares the positioning data with area center data of every first geographical area data in the plural geographical area data to obtain target geographical area data based on a comparison result, and an Euclidean distance between the area center data of the target geographical area data and the positioning data is the smallest, the processor determines whether the target geographical area data includes plural second geographical area data, when the target geographical area data includes plural second geographical area data, the processor takes the second geographical area data as the first geographical area data and compares the positioning data with area center data of every first geographical area data in the plural geographical area data to obtain target geographical area data based on a comparison result again, and when the target geographical area data does not include plural second geographical area data, the processor displays the target geographical area data on the digital picture corresponding to the shooting place.

2. The hand-held device having positioning and photographing functions according to claim 1, further including a storage medium which couples with the processor; after marking the target geographical area data on the digital picture, the processor compressing the digital picture as an image file and storing the image file in the storage medium.

3. The hand-held device having positioning and photographing functions according to claim 1, wherein the target geographical area data is an address, and the address is selected from a group consisting of a country, a state, a province, a metropolitan, a territory, a shire, a county, a city, a township, a village, a road, a street, a section, a lane, an alley and a number.

4. The hand-held device having positioning and photographing functions according to claim 1, wherein the target geographical area data is a geographical name.

5. The hand-held device having positioning and photographing functions according to claim 1, wherein the database includes plural country codes corresponding to the geographical area data, and the target geographical area data includes one target country code of the shooting place.

6. The hand-held device having positioning and photographing functions according to claim 1, wherein the database includes plural international phone numbers corresponding to the geographical area data, and the target geographical area data includes one international phone number of the shooting place.

7. The hand-held device having positioning and photographing functions according to claim 1, wherein the processor displays time on the digital picture time when the digital picture is captured.

8. A hand-held device having positioning and photographing functions, the hand-held device comprising:
    a photographing module which is used to photograph an environment of a shooting place to form a digital picture;
    a positioning module which is used to access positioning data of the shooting place;
    a database which stores plural geographical area data and plural boundary pointers of the plural geographical area data; and
    a processor which couples the photographing module, the positioning module and the database; wherein while obtaining the digital picture, the processor obtains plural boundary pointers of plural first geographical area data and searches along plural different directions by taking the positioning data as a start point to find out target boundary pointers that are closest to the positioning data on each different direction, the processor compares the target boundary pointers with the boundary pointers to access target geographical area data from the first geographical area data, and determines whether the target geographical area data includes plural second geographical area data, when the target geographical area data includes plural second geographical area data, the processor takes the second geographical area data as the first geographical area data, and obtains plural boundary pointers of plural first geographical area data again, and when the target geographical area data does not include plural second geographical area data, the processor displays the target geographical area data on the digital picture corresponding to the shooting place.

9. The hand-held device having positioning and photographing functions according to claim 8, further including a storage medium which couples with the processor; after marking the target geographical area data on the digital picture, the processor compressing the digital picture as an image file and storing the image file in the storage medium.

10. The hand-held device having positioning and photographing functions according to claim 8, wherein the target geographical area data is an address, and the address is selected from a group consisting of a country, a state, a province, a metropolitan, a territory, a shire, a county, a city, a township, a village, a road, a street, a section, a lane, an alley and a number.

11. The hand-held device having positioning and photographing functions according to claim 8, wherein the target geographical area data is a geographical name.

12. The hand-held device having positioning and photographing functions according to claim 8, wherein the database includes plural country codes corresponding to the geographical area data, and the target geographical area data includes one target country code of the shooting place.

13. The hand-held device having positioning and photographing functions according to claim 8, wherein the database includes plural international phone numbers corresponding to the geographical area data, and the target geographical area data includes one international phone number of the shooting place.

14. The hand-held device having positioning and photographing functions according to claim 8, wherein the processor displays time on the digital picture time when the digital picture is captured.

* * * * *